April 17, 1951 M. P. WINTHER 2,549,738
TRANSMISSION
Filed April 8, 1949 4 Sheets-Sheet 2

Martin P. Winther,
Inventor.
Haynes and Koenig,
Attorneys.

April 17, 1951 M. P. WINTHER 2,549,738
TRANSMISSION
Filed April 8, 1949 4 Sheets-Sheet 3

Martin P. Winther,
Inventor.
Haynes and Koenig,
Attorneys.

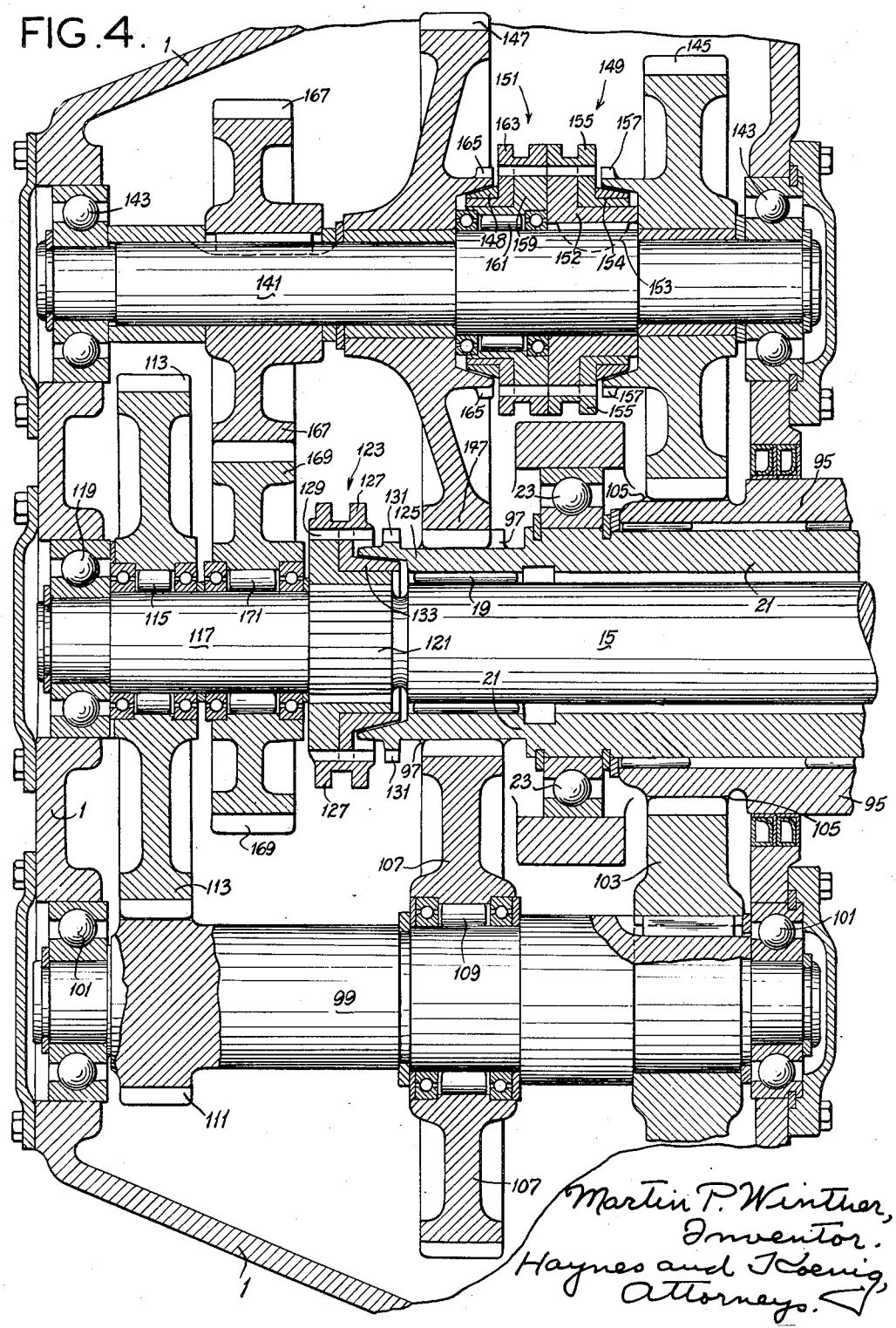

Patented Apr. 17, 1951

2,549,738

UNITED STATES PATENT OFFICE 2,549,738

TRANSMISSION

Martin P. Winther, Gates Mills, Ohio, assignor to Martin P. Winther, as trustee

Application April 8, 1949, Serial No. 86,201

22 Claims. (Cl. 74—330)

This invention relates to transmissions, and with regard to certain more specific features, to transmissions incorporating multiple clutches and selectively operable torque-converting gears.

Briefly, the invention comprises several main clutches driven from a common source and adapted selectively to be operated so that any or all may close in. The output torques of these clutches are delivered to the output of the transmission through a gear-type torque convertor in such a manner that with a minimum number of gears in a compact arrangement kept permanently in mesh, a large number of conversion steps (five in the present example) may be had. This is effected by arranging gear trains from the clutches to the output through a group of intermediate shafts and by the use of suitable overrunning clutches for automatically bringing into action in response to main clutch operation one or the other of the shafts and one or another train acting through a particular shaft. The arrangement is such that before the flow of power is transferred from one gear train to another, the latter is so prepared that upon a shift in conditions it picks up power flow in such manner that speed ratio changes may progress in either direction under full power without a break or overlap in torques delivered from the clutches.

The invention has for its object the provision of a transmission which will operate smoothly and efficiently throughout a number of relatively finely graded steps which can be designed closely to match the performance of any power unit and without overlap of torque flow or loss of acceleration occurring between steps; all obtained with dependable structure easily adaptable for design according to various large numbers of steps. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal detail section taken through the transmission as a whole;

Fig. 4 is an enlarged longitudinal section of a gear box;

Similar reference characters indicate corresponding parts throughout the several views of the drawings.

Hereinafter reference will be made to various overrunning roller clutches, and to gear synchronizers or locking dental couplings incorporating synchromesh elements. Since the details of overrunning clutches and gear synchronizers are well-known to those skilled in the art, and the present invention concerns a combination incorporating their use as units, it will be unnecessary to describe these in detail inasmuch as there are many variations of the details of these which make no essential difference to the present invention. However, should further details of these units be desired, they may be found in "Torque Converters" by P. M. Heldt, second edition, 1944; pages 88–100 as to overrunning clutches, and pages 158–166 as to gear synchronizers.

Figure 1:
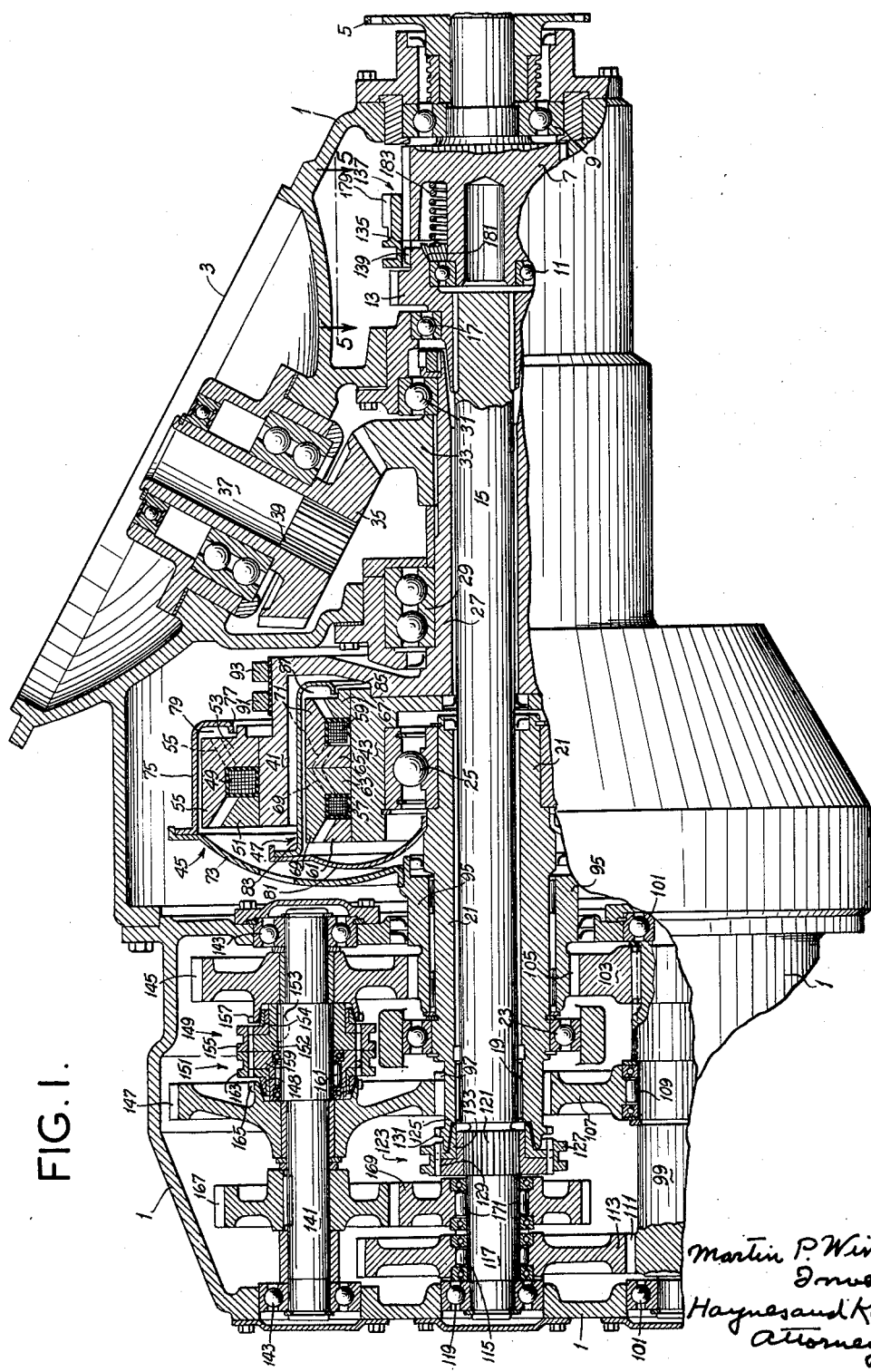

Referring now more particularly to Fig. 1, there is shown at numeral 1 a housing assembly which includes a flange 3 adapted to be bolted to the fly-wheel housing of a driving engine (not shown). The angular position of this flange is to meet the needs of a rear engine mounting in a vehicle such as on a bus, wherein the engine is mounted parallel to the rear axle and the propeller shaft is at an angle to the center line of the vehicle. Numeral 1 has been applied repeatedly to Fig. 1 in such locations as will most readily indicate its extension as a frame for the parts to be described. The output of the transmission is delivered to the propeller shaft through a flange 5 carried at the right. This flange is carried upon a quill 7 which is rotary in a bearing 9 in the housing and piloted on bearing 11 within a gear 13. Gear 13 is assembled with a driven shaft 15 which determines the main center line of the transmission. The assembly 13, 15 is carried at the right upon bearings 17 in the frame 1, and at the left passes through a sleeve bearing 19 within a coaxial quill 21. Shaft 15 continues on to the left through a splined portion 121 and a stub extension 117 into a bearing 119 in the frame 1.

The quill 21 around shaft 15 is carried at the left upon a bearing 23 in the frame 1 and is piloted at the right in a bearing 25 carried within a part 43 attached to another quill 27.

The quill 27 is carried upon bearings 29 and 31 in the housing 1. Keyed to it is a bevel gear 33 which meshes with a driving bevel gear 35, forming part of an angled input quill 37. This quill 37 is splined as shown at 39 and is for the reception of the splined end of the engine crankshaft or a part connected therewith, so that the gear 35 is driven directly by the engine and therefore, as stated, constitutes a driver of the transmission. In effect the gear 35 rotates with the engine flywheel.

The quill 27 is formed at the left as two magnetic drums 41 and 43 of magnetic clutches shown generally at numerals 45 and 47. The drum 41 carries an annular field coil 49, flanked by annular magnetic claw-type pole rings 51 and 53, which carry interdigitated polar teeth 55. Thus the members 41, 49, 51, 53 and 55 form the driving polar field member of the clutch 45.

Around the drum 43 are carried annular field coils 57 and 59, flanked by claw-type magnetic pole rings 61, 63, 65 and 67. The rings 61, 63 carry interdigitated poles 69 and the rings 65, 67 carry interdigitated poles 71. The members 43, 57, 59, 61, 63, 65, 67 and 69 form the driving polar field member of the clutch 47. The general character and purposes of the poles 55, 69 and 71 are known, and no further description will be necessary except to state that they polarize the toroidal magnetic fields that occur around the coils 49, 57 and 59 when the latter are excited.

Figure 2:
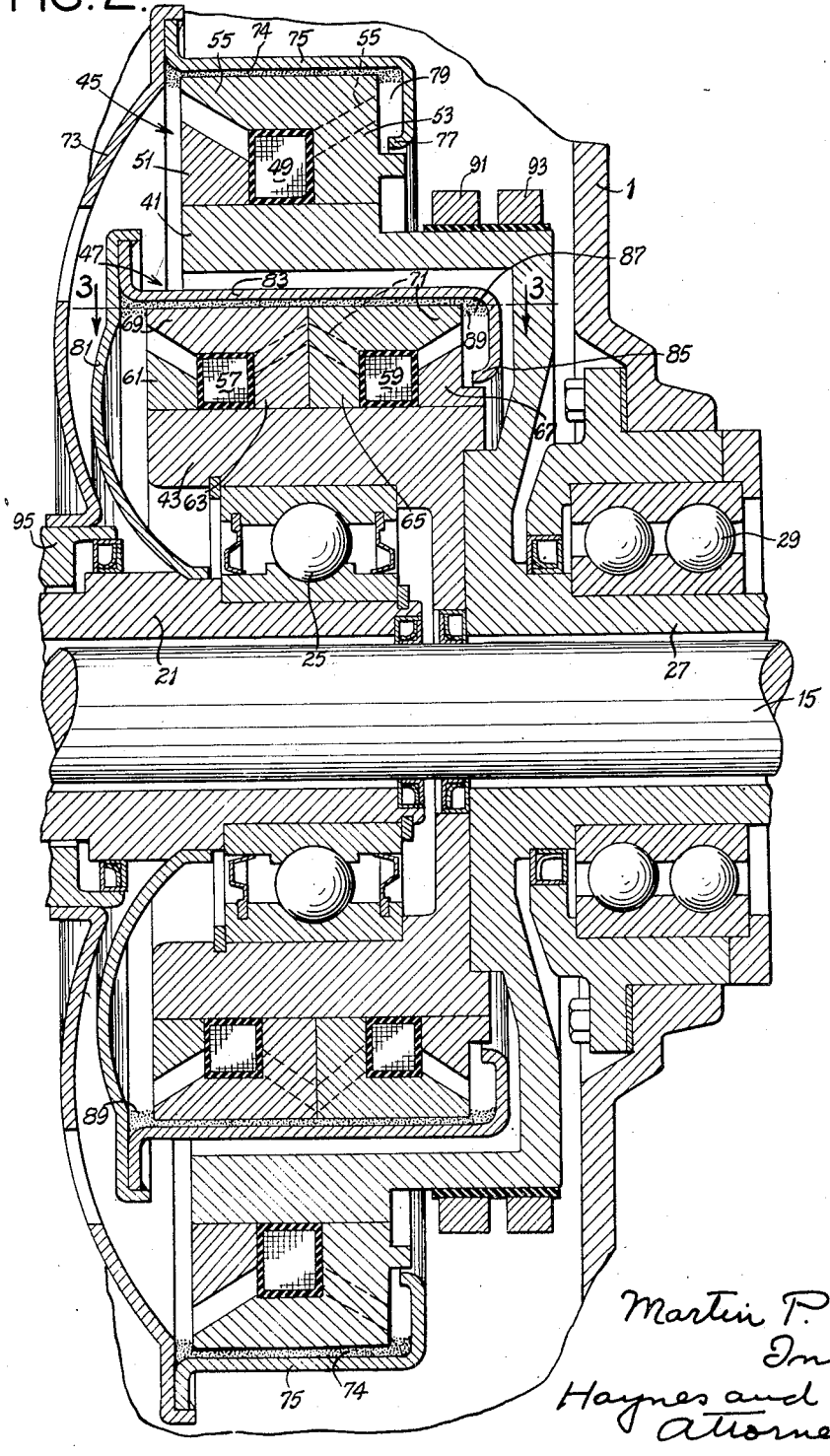
Fig. 2 is an enlarged cross section showing certain clutch elements of the invention.
Figure 3:
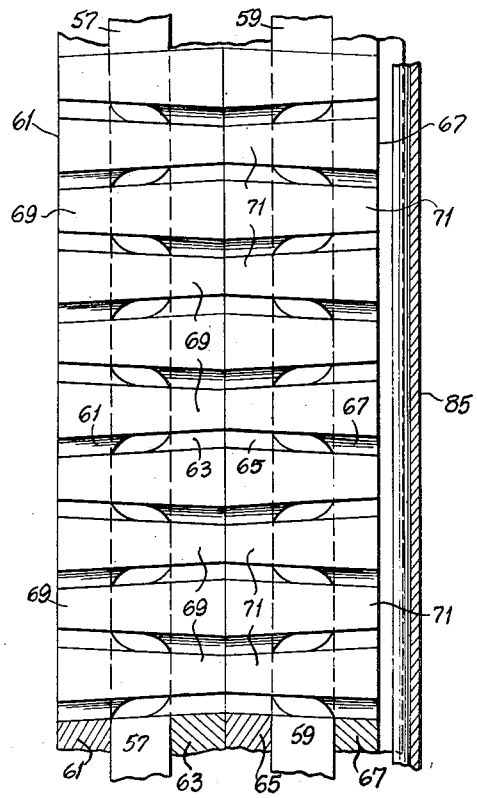
Fig. 3 is a fragmentary developed section taken on line 3—3 of Fig. 2, showing certain pole teeth.

The driven member of the clutch 45 is constituted by a flange 73, which peripherally carries a magnetic inductor drum 75 closely surrounding the poles 55 and being provided in connection with the ring 53 with a labyrinth running seal 77. The drum adjacent to the seal 77 forms a chamber 79. When the coil 49 is energized, the polarized magnetic flux field established by the poles 55 interlinks the inductor 75 to induce eddy currents therein upon relative motion between the poles and inductor. These currents produce reactive magnetic flux with the flux field from the poles, so as to effect a preliminary magnetic slip coupling condition during acceleration of the driven member. When the coil is deenergized, the coupling is broken. A small amount of magnetic fluid 74 (Fig. 2) is carried in the drum 75, which is drawn in by magnetic induction into the space between it and the poles 55 when the coil 49 is excited. This fluid stiffens and effects a 1:1 rotation between driving and driven members 41 and 73, respectively, under final conditions of excitation of coil 49. The magnetic fluid may for example be a 9:1 mixture by weight of light machine oil and finely divided iron.

The clutch 47 is of a similar but two-coil type, having a driven flange 81 carrying an inductor drum 83 which has a labyrinth seal 85 with the ring 67 and forms a chamber 87. The magnetic fluid for this clutch is shown at 89 and operates the same as the fluid in clutch 45 already described. Further details regarding magnetic fluid clutches of the type above referred to will be found in my U. S. patent application Serial No. 28,452, filed May 21, 1948, eventuated as Patent 2,525,571, for Dynamoelectric Machine Containing a Magnetic Fluid Mixture. Further details will be unnecessary herein, it sufficing to state that whenever coil 49, or coils 57 and 59 are energized, the driven members of the respective clutches 45 or 47 are accelerated under nonwearing, magnetic slip conditions until the magnetic fluid therein solidifies to effect a 1:1 drive in the respective clutch.

The coil 49 is energized from a slip ring 91, and coils 57 and 59 from a slip ring 93. The external circuits and brushes for the slip rings 91 and 93 are not shown, nor the cross connections between these and the coils 49 or 57, 59, respectively, because slip ring circuits for feeding rotating coils are well-known. The circuits from the coils are suitably grounded to complete their respective circuits.

It should at this point be pointed out that while the stated magnetic fluid clutches are preferable and have advantages of a smoothly controlled acceleration with an ultimately positive 1:1 drive, other electric or mechanical friction clutches may be used.

The driven member 73 of clutch 45 carries a quill 95, which is rotary around the quill 21 already mentioned. Quill 21 is connected to the driven flange 81 of clutch 47. Thus the quills 21 and 95 may be simultaneously or selectively driven from the clutches 47 and 45, respectively. Quill 21 is provided at its left end with a pinion 97, which is in a gear box shown enlarged in Fig. 4. This box carries a first intermediate lay- or countershaft 99, supported upon bearings 101. Keyed to the layshaft 99 is a gear 103, meshing with a pinion 105 carried on the end of the other quill 95. The pinion 105 is thus driven by the clutch 45. The stated pinion 97 on quill 21 (driven from clutch 45) meshes with a gear 107, the latter having a driving connection with shaft 99 through an overrunning roller clutch 109. For details of overrunning roller clutches see the Heldt reference above mentioned. Briefly, the clutch 109 allows gear 107 to drive the layshaft 99 until the layshaft is driven from another point (as from gear 103) faster than gear 107 is capable of driving it. In the latter case gear 107 will drive layshaft 99 through clutch 109 only so long as pinion 105 is not driving the gear 103. Noting that pinion 97 is smaller than pinion 105 and that gear 107 is larger than gear 103, if pinion 105 drives gear 103, the angular velocity of the layshaft 99 will be higher than gear 107 is capable of producing, assuming that pinions 97 and 105 operate at the same angular velocity. Thus overrunning occurs automatically when clutch 45 is closed, regardless of whether clutch 47 is open or closed. This loads closed clutch 45. When clutch 45 is open and clutch 47 closed overrun does not occur. This loads closed clutch 47.

The left end of the layshaft 99 is provided with a pinion 111, meshing with a gear 113 carried on an overrunning clutch 115 surrounding the stub end 117 of driven shaft 15. At the right side of the stub 117 shaft 15 is splined as at 121, which forms a coupling with the hub of a synchromesh crown or dental coupling 123. The other side 125 of this coupling 123 is a part of the quill 21. As to the synchronizing elements of the dental coupling 123 and of other similar dental couplings used herein it will suffice to say that such a coupling has a shift collar 127, internally splined as shown at 129. This is for axial movement. Its driven member 125 has teeth 131 with which the internal splines 129 of the shift collar 127 interdigitate upon moving the shift collar to the right (Figs. 1 and 4). Under these conditions, the quill 21 is in direct driving connection with the shaft 15. When the shift collar 127 is moved to the left, the splines 129 disengage from the teeth 131. Under these conditions, the quill 21 is out of direct driving engagement with the shaft 15. Since the only purpose of the synchronizing elements (the friction cone of which appears at 133) is to assure a non-clashing engagement of the splines 129 and teeth 131 and the synchronizing structures are well-known to those skilled in the art, further comment will be unnecessary (see also the Heldt reference mentioned above).

From the above, assuming the dental coupling 123 to be open (collar 127 to the left and clutch 45 deenergized or off), the following low- or first-speed gear train may be traced, assuming that clutch 47 is excited and driving (energized or on) and clutch 45 is off (see also the table below): quill 21, pinion 97, gear 107, clutch 109 which locks, layshaft 99, gears 111, 113, overrunning roller clutch 115 which locks, stub 117 to shaft 15. This brings us to the right-hand end of the transmission, where at this time a splined shift collar 135 of a dental coupling 137 has been moved to the left so that its internal splines lock with auxiliary teeth 139 on gear 113. This in effect directly couples shaft 15 to the quill 7 and the connected driven flange 5.

Second-speed drive is accomplished by exciting coil 49, thus energizing clutch 45 to "on" condition. After clutch 45 has been energized, clutch 47 may be deenergized to "off" condition, but this is optional. The second-speed drive then may be traced through quill 95, gears 105, 103, layshaft 99, and then to shaft 15 as in first-speed operation. It will be seen that, since the clutches 45 and 47 if both energized are driven at the same speed from the quill 27, and gear 105 is larger than gear 97, gear 103 being smaller than gear 107, shaft 99 will operate at a higher speed than the gear 107. Overrunning clutch 109 then unlocks and permits shaft 99 to overrun the gear 107. At this time it is of no importance whether clutch 47 is energized or not, because the entire driving load is carried by clutch 45, the system which it drives overrunning the system which clutch 47 drives. In other words, clutch 47 cannot overtake and pick up the load whether energized or deenergized. It is, however, necessary that clutch 47 be deenergized when closure occurs of a dental coupling to be mentioned under the description of third-speed operation. This will be referred to below.

In view of the above, it will be seen that both first- and second-speed operations occur via the countershaft 99, gears 111, 113 and overrunning clutch 115.

Third and fourth speeds occur through gear trains associated with a second layshaft 141, supported in bearings 143 in the case 1, preferably opposite the countershaft 99 and equally distant from the center line of the transmission. Carried on the countershaft 141 are two normally loose gears 145 and 147, these being mounted on suitable sleeve bearings on shaft 141. Numerals 149 and 151 illustrate two synchromesh dental couplings. Coupling 149 has its hub 152 keyed to the shaft 141, as illustrated at 153. This hub 152 carries a synchromesh cone element 154, which needs not further to be described for reasons above stated. The splined shifting collar 155 of 149 is axially engageable and disengageable with teeth 157 of the gear 145. Thus by shifting the collar 155 to the right, the gear 145 is in effect connected with shaft 141 through the coupling. Otherwise the gear is loose, as stated. The dental coupling 151 has a hub 159 which is connectible with the shaft 141 through overrunning clutch 161. The splined shifting collar 163 of coupling 151 is axially engageable and dis- engageable with teeth 165 of the gear 147. Its friction cone is shown at 148. Thus by shifting the collar 163 to the left, the gear 147 is in effect connectible with shaft 141 through overrunning roller clutch 161. Otherwise, the gear is loose, as stated. Gear 145 meshes with the pinion 105 driven by clutch 45. Gear 147 meshes with the pinion 97 driven by clutch 47. In addition, there is keyed to the layshaft 141 a gear 167, which meshes with a gear 169 surrounding the stub end 117 of shaft 15 and connecting therewith through an overrunning roller clutch 171.

Third speed is brought into play first by shifting to the left the collar 163 of dental coupling 151. This may be accomplished when clutch 47 is deenergized. Thus gear 147 may connect with shaft 141 through the overrunning roller clutch 161 which will automatically lock. Then clutch 47 is energized and the drive is taken away from clutch 45 (if energized) and its driving train via layshaft 99. This occurs through quill 21, pinion 97, gear 147, dental coupling 151, locked overrunning clutch 161, shaft 141, gears 167, 169, locked overrunning clutch 171 to the stub end 117 of shaft 15. The reason that clutch 47 takes the drive away from clutch 45 (even though clutch 45 may be energized at the time clutch 47 is energized) is that the speed reduction is less through gears 97, 147, 167 and 169 than it is through gears 105, 103, 111, 113. This reduction through 97, 147, 167, 169 is also less than the speed reduction through 97, 107, 111 and 113. Thus clutch 115 automatically unlocks as clutch 171 picks up the drive. It is next desirable before shifting into fourth speed to deenergize clutch 45, so that the train connected with clutch 45 is in best condition to have shifted a dental coupling therein (and to be mentioned).

Fourth-speed operation is instigated by moving the collar 155 of dental coupling 149 to the right, thus coupling gear 145 with the countershaft 141. This is done under deenergized conditions of the clutch 45. After the dental coupling 149 has been closed, clutch 45 is energized, which causes it to take away the drive from energized clutch 47. The drive then from clutch 45 is through quill 95, gears 105, 145, closed dental coupling 149, countershaft 141, gears 167, 169, locked overrunning clutch 171, stub 117 to shaft 15. At this time clutches 161 and 115 unlock and the drive is taken away from clutch 47 because the gear train 105, 145, 167, 169 has a smaller speed drop than the train 97, 147, 167, 169. This is responsible for unlocking of clutch 161. The gear train 105, 145, 167, 169 also has a smaller speed drop than either of the trains via layshaft 99 which accounts for the open condition of clutch 115.

Fifth or high speed is attained by first deenergizing clutch 47, which frees the quill 21. The shift collar 127 of dental coupling 123 is then shifted to the right, thus coupling quill 21 directly to shaft 15. During this period, clutch 45 is carrying the load in fourth speed. Then the clutch 47 is finally energized for direct drive, the overrunning clutch at 171 unlocking, even though clutch 45 remains energized. This is because the direct drive from clutch 47 to shaft 15 has no speed drop, whereas the gear train 105, 145, 167, 169 from clutch 45 to shaft 15 has a speed drop, which is responsive for clutch 171 unlocking. It will be observed that in fifth or high speed, the overrunning clutches 109, 115, 161 and 171 are all unlocked or released. One advantageous effect of the release of clutches 115 and 171 is that the speeds of the countershafts 99 and 141 and any parts that may be coupled therewith during high-speed drive are considerably reduced, since the drives between pinions 105 and 103 and between gears 97 and 107 are speed-reducing; whereas this is not true of the drives between gears 169 and 167, or between gears 113 and 111.

Figure 5:
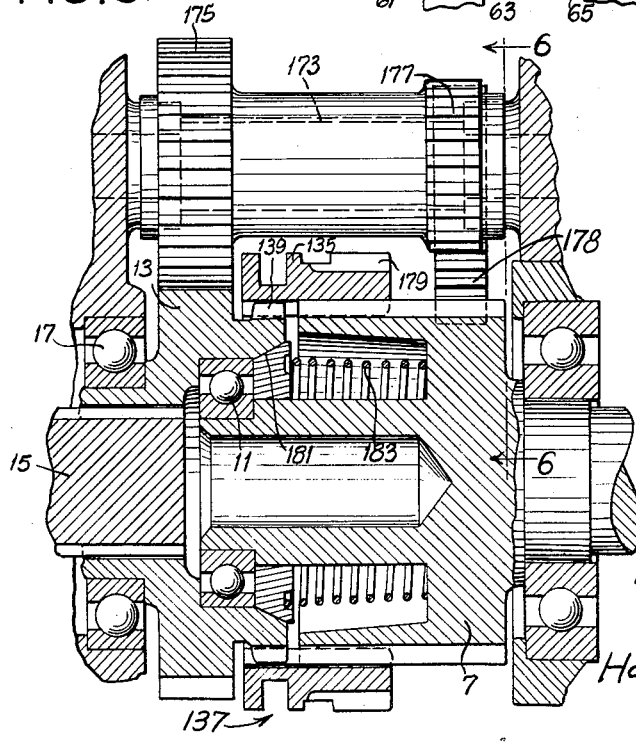
Fig. 5 is a detail plan view of a reverse gear arrangement, viewed from line 5—5 of Fig. 1.
Figure 6:
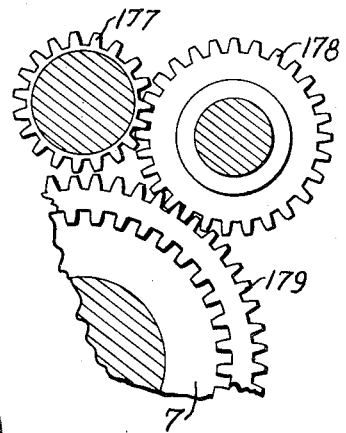
Fig. 6 is a fragmentary cross section taken on line 6—6 of Fig. 5.

Reverse gear is instigated by a conventional reverse gear at the member 137, as will be made clear from Fig. 5. A short countershaft 173 carries a gear 175, meshing with gear 13. At its other end, it carries a gear 177 which is adapted to mesh with an idler gear 178. The splined shift collar 135 carries a gear 179. When the sleeve 135 is adjusted to the left, gear 179 unmeshes from gear 178. When the sleeve 135 is moved to the right, the teeth 139 are disengaged and gear 179 meshes with gear 178. This breaks the direct connection between shaft 15 and the quill 7, replacing it with a reversing drive through gears 13, 175, 178 and 179. At this time a small cone clutch 181, which is biased shut by means of the spring 183, slips. This cone element functions as a synchronizer between shaft 15 and quill 7 when the sleeve 135 is moved to the left to reengage with teeth 139. Thus conventional reverse operation can be selected to occur at any of the gear reductions specified for the first to fifth speeds already described but first or low speed is preferable. At the time that sleeve 135 is coupled in, clutch 47 should temporarily be deenergized. An increase in speed drop over that attained in other speeds occurs through the reverse gear train as will be apparent from the gear sizes illustrated in Fig. 5.

Following is the table above mentioned of significant conditions of various elements for various speeds. Wherever a dash appears in this table, the condition of the pertinent element at the speed considered is not unique. Bracketed items show momentary conditions.

clutch 47 to allow closure of coupling 123, then reenergize clutch 47 to drive directly to shaft 15, which overruns all other drives.

It will be understood that if the couplings 123, 149 and 151 were to be made of the friction variety that may be closed under load, it would then be unnecessary, although highly desirable, temporarily to deenergize either of the clutches 45 or 47 when making some of the shifts, as above stated. This is mentioned because of a simplification which such a concept establishes in the understanding of the invention. The operation would then be as follows for the various speeds:

First or low speed, energize clutch 47, which drives via layshaft 99;

Second speed, energize clutch 45, which drives via layshaft 99, overrunning the first-speed drive of clutch 47;

Third speed, close coupling (now suggested clutch) 151, resulting in clutch 47 driving via layshaft 141 and overrunning both its own first-speed drive via layshaft 99 and the second-speed drive of clutch 45 via layshaft 99;

Fourth speed, close coupling (not suggested clutch) 149, causing clutch 45 to drive via layshaft 141, overrunning its own second-speed drive via layshaft 99 and also overrunning either the first-speed drive of clutch 47 via layshaft 99 or the third-speed drive of clutch 47 via layshaft 141;

Fifth or high speed, close coupling (now suggested clutch) 123, causing clutch 47 to pick up direct drive to shaft 15, overrunning all other drives of either clutch 45 or 47 via either layshaft 99 or 141.

It will be understood that the members 123, 149 and 151 are actually preferably in the forms of the synchronizing dental clutches shown (requiring unloading of the power trains in which they are located) rather than friction clutches which do not have such requirement, because

*Table of clutch and coupling conditions*

| Clutch or Coupling | Speed | | | | | |
|---|---|---|---|---|---|---|
| | First | Second | Third | Fourth | Fifth | Reverse |
| Magnetic Clutch 45 | Off | On | (On) Then off | On | (On) Then off | Off. |
| Magnetic Clutch 47 | On | (On) Then off | On | (On) Then off | On | On. |
| Overrunning Clutch 109 | Lock | Unlock | Unlock | Unlock | Unlock | Lock. |
| Overrunning Clutch 115 | do | Lock | do | do | do | Do. |
| Dental Coupling 123 | Open | Open | Open | Open | Close | Open. |
| Dental Coupling 149 | do | do | do | Close | do | |
| Dental Coupling 151 | do | do | Close | do | do | |
| Overrunning Clutch 161 | | | Lock | Unlock | Unlock | |
| Overrunning Clutch 171 | | | do | Lock | do | |
| Clutch 137 | Lock | Lock | do | do | Lock | Open while 47 is off. |
| Gear train 13, 175, 177, 178, 179 | Open | Open | Open | Open | Open | Close. |

A useful brief recapitulation of operation is as follows for the various speeds:

First or low speed, energize clutch 47, which drives via layshaft 99;

Second speed, energize clutch 45, which drives via layshaft 99, overrunning the drive from clutch 47;

Third speed, temporarily deenergize clutch 47 to allow coupling 151 to be closed, then reenergize clutch 47, which will drive via the layshaft 141, overrunning the drive of clutch 45 via layshaft 99;

Fourth speed, temporarily deenergize clutch 45 to allow closure of coupling 149 and reenergize clutch 45, which drives through layshaft 141, overrunning any drive that clutch 47 may effect through either layshaft 99 or 141;

Fifth or high speed, temporarily deenergize the requisite friction clutches would need to have large friction surfaces; whereas the dental clutches have very small friction surfaces and may be made small and compact.

The arrangements according to the invention are advantageous because it is a relatively easy matter in design to add additional gear trains between the layshaft 99 and the stub end 117 of shaft 15 (with a suitable overrunning clutch, as already made clear) to increase the number of speeds available in the transmission. Moreover, more countershafts, such as a third or even a fourth, can be included in a design to provide as many added speeds as desired. That this is true is clear from the reverse proposition that by eliminating countershaft 141 the present construction reverts to a three-speed transmission. Therefore, the transmission has great possibilities for efficiently meeting the operating requirements of various engines. Moreover, the multiple lay- or countershaft construction makes possible a maximum number of speeds with a minimum number of gears. An important operating improvement afforded by the invention is that at each gear shift, the transmitted load is fully carried by a driving train at one speed ratio until it is picked up by another driving train operating at the next speed ratio, without any interval of break in the driving connection between the engine and the transmission output. Thus shifting from speed to speed may be accomplished under continuous full load conditions and without skip or loss of acceleration and without any balk due to inconsistent torque requirements in any element. Moreover, this effect is accomplished without the necessity for any precise adjustments to eliminate torque overlap (which causes balking) or absence of torque between shifts (which causes torque skip), as in the case in some automatic transmissions.

Compactness of structure is attained because the gear drives between the respective clutches 45 and 47 to the respective countershafts 99 and 141 are reverted back into the driven shaft 15. Thus, for example, the pinion 97, driven by clutch 47, drives out to both countershafts 99 and 141, the respective motions reverting back to the shaft 15 through trains 111, 113 and 167, 169, respectively. These latter trains are also the reverting trains for the drives from clutch 45 through gears 105, 103, and 145. The resulting compactness of structure and saving in number of gears are evident. Epicyclic or planetary trains are avoided.

With regard to coordination between excitation of the electromagnetic clutches 45 and 47, and the operation of the collars 135, 155, 163 and 127, these may be accomplished manually for the purposes of the present description. The grooves shown in the members 135, 155, 163 and 127 are for use of the ordinary shifter forks employed for operating such devices, further description in this connection being unnecessary, since such forks and their connected mechanisms are common. However, the transmission is adaptable to automatic control in response to desired variables such as vehicle speed, manifold pressure, throttle position, or combinations of these. But since the present invention is concerned with the mechanical form of the transmission, as distinguished from its controls, the foregoing description assumes the existence of a properly controlled sequence.

For the purpose of simplifying the wording of certain claims, the following terminology is employed: The gear trains between the stub end 117 of shaft 15 and the clutches 45 and 47 via the layshafts 99 and 141 are called reverting gear trains. These reverting gear trains, if considered to start at stub 117, have branching trains to the clutches. For example, one reverting train from 117 to both clutches 45 and 47 through layshaft 99 is 113, 111, having branches 107, 97 and 103, 105. The other reverting train from 117 to both clutches 45 and 47 through layshaft 141 is 169, 167, having branches 147, 97 and 145, 105. From another viewpoint, the power clutches 45 and 47 may be considered to have individual branched gear trains or drives to the layshafts 99 and 141.

For example, the branched train or drive from clutch 47 is 97, 107 (to layshaft 99, which branch reverts to shaft 15 through 111, 113); and 97, 147 (to layshaft 141, which branch reverts to shaft 15 through 167, 169). The branched train or drive from clutch 45 is 105, 103 (to layshaft 99, which branch reverts to shaft 15 through 111, 113); and 105, 145 (to layshaft 141, which branch reverts to shaft 15 through 167, 169).

The clutches 45 and 47 are called power clutches to distinguish them from other clutching mechanism such as the dental couplings 123, 149 and 151, and from the overrunning clutches 109, 115, 171 and 161. A completed train is to be understood as one in which all elements therein have been prepared to transmit a driving load, provided that train is the completed one having the lowest speed drop at the time under consideration.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A transmission comprising a driving member and a driven member, the driving member driving several power clutches each having a driven element, a plurality of countershafts, each power clutch having a gear drive to each countershaft, one of the gear drives to each countershaft having a speed drop greater than the other and including therein an overrunning clutch, whereby the other gear drive for the respective countershaft may overrun when its respective power clutch is energized, and gear drives from the respective countershafts to the driven member, at least one of said last-mentioned gear drives including an overrunning clutch.

2. A transmission comprising a driving member and a driven member, the driving member driving several power clutches each having a driven element, a plurality of countershafts, each clutch having a gear drive to each countershaft, one of the gear drives to each countershaft having a speed drop greater than the other and including therein an overrunning clutch, whereby the other gear drive for the respective countershaft may overrun when its respective power clutch is energized, and gear drives from the respective countershafts to the driven member, each of said last-mentioned gear drives including an overrunning clutch.

3. A transmission comprising a driver, a driven shaft, first and second intermediate shafts having geared connections with the driven shaft, the geared connection from the first intermediate shaft having a greater speed drop than the geared connection from the second intermediate shaft and including an overrunning clutch, a first and a second clutch selectively operable from the driver, first and second driven members connected with the respective clutches, the first clutch-driven member having geared connections to the intermediate shafts respectively, said connections respectively including overrunning clutches, said second clutch-driven member having geared connections respectively with said intermediate shafts the speed drops of which are less than the speed drops of the geared connections between the first clutch-driven member and the intermediate shafts.

4. A transmission comprising a driver, a driven shaft, first and second countershafts having geared connections with the driven shaft including overrunning clutches, the geared connection from the first countershaft having a greater speed drop than the geared connection from the second countershaft, a first and a second clutch selectively operable from the driver, first and second driven members connected with the respective clutches, the first clutch-driven member having geared connections to the countershafts respectively, said connections respectively including overrunning clutches, said second clutch-driven member having geared connections respectively with said countershafts the speed drops of which are less than the speed drops of the geared connections between the first clutch-driven member and the countershafts.

5. A transmission comprising a driver, a driven shaft, first and second intermediate shafts having geared connections with the driven shaft including overrunning clutches, the geared connection from the first intermediate shaft having a greater speed drop than the geared connection from the second intermediate shaft, a first and a second clutch selectively operable from the driver, first and second driven members connected with the respective clutches, the first clutch-driven member having geared connections to the intermediate shafts respectively and respectively including overrunning clutches, said second clutch-driven member having geared connections respectively with said intermediate shafts the speed drops of which are less than the speed drops of the geared connections between the first clutch-driven member and the intermediate shafts, and selectively openable clutches in each of the geared connections between the second intermediate shaft and the clutch-driven members.

6. A transmission comprising a driver, a driven shaft, first and second countershafts having geared connections with the driven shaft including overrunning clutches, the geared connection from the first countershaft having a greater speed drop than the geared connection from the second countershaft, a first and a second clutch selectively operable from the driver, first and second driven members connected with the respective clutches, the first clutch-driven member having geared connections to the countershafts respectively and respectively including overrunning clutches, said second clutch-driven member having geared connections respectively with said countershafts the speed drops of which are less than the speed drops of the geared connections between the first clutch-driven member and the countershafts, and a selectively closable clutch between the first clutch-driven member and said driven shaft.

7. A transmission comprising a driver, a driven shaft, first and second countershafts having geared connections with the driven shaft including overrunning clutches, the geared connection from the first countershaft having a greater speed drop than the geared connection from the second countershaft, a first and a second clutch selectively operable from the driver, first and second driven members connected with the respective clutches, the first clutch-driven member having geared connections to the countershafts respectively and respectively including overrunning clutches, said second clutch-driven member having geared connections respectively with said countershafts the speed drops of which are less than the speed drops of the geared connections between the first clutch-driven member and the countershafts, selectively closable clutches in each of the geared connections between the second countershaft and the clutch-driven members, and a selectively closable clutch between the first clutch-driven member and said driven shaft.

8. A transmission comprising a driven shaft, a driving quill surrounding said shaft, first and second countershafts lying parallel to the driven shaft and having geared connections with said driven shaft including overrunning clutches, the geared connection from the first countershaft having a greater speed drop than the geared connection from the second countershaft, a first and a second selectively operable clutch each having a driving element directly connected to the driver, first and second driven quills connected with the respective clutches and surrounding the driven shaft, the first quill having geared connections to the countershafts respectively and respectively including an overrunning clutch, said second quill having geared connections respectively with said countershafts the speed drops of which are less than the speed drops of the geared connections between the first driven quill and the countershafts, selectively openable clutches in each of the geared connections between the quills and the second countershaft, and a selectively closable clutch between the first driven quill and said driven shaft.

9. A transmission comprising a driving member and a driven member, the latter comprising a shaft on a center line, the driving member driving the driving elements of several clutches, each clutch having a driven clutch element rotary about said center line, a plurality of countershafts parallel to said center line, the respective clutches having gear drives to each countershaft, one of the gear drives to each countershaft having a speed drop greater than the other and including therein an overrunning clutch, whereby the other gear drive for the respective countershaft may overrun when its respective clutch is energized, and gear drives from the respective countershafts to the driven member reverting to it, at least one of said reverting gear drives including an overrunning clutch.

10. A transmission comprising a driving member and a driven member, the driving member driving the driving elements of several power clutches, each clutch having a driven element, a plurality of countershafts, each clutch-driven element having a gear drive to each countershaft, one of the gear drives to each countershaft having a speed drop greater than the other and including therein an overrunning clutch, whereby the other gear drive for the respective countershaft may overrun when its respective power clutch is energized, and gear drives from the respective countershafts to the driven member, both of said last-mentioned gear drives including an overrunning clutch, and an openable clutch in each gear drive associated with one of the countershafts for selectively coupling these respective gear drives with the last-named countershaft.

11. A transmission comprising a driving member and a driven member, the driving member being coupled with the driving elements of several power clutches, each clutch having a driven element, a plurality of countershafts, each clutch-driven element having a gear drive to each countershaft, one of the gear drives to each countershaft having a speed drop greater than the other and including therein an overrunning clutch, whereby the other gear drive for the respective countershaft may overrun when its respective power clutch is energized, gear drives from the respective countershafts to the driven member, both of said last-mentioned gear drives including an overrunning clutch, and an openable and closable clutch between at least one of the clutch-driven elements and the driven member.

12. A transmission comprising a driver, a driven shaft, a first and a second power clutch respectively operable from the driver, first and second intermediate shafts, a first geared connection of relatively large speed drop extending between the first intermediate shaft and the driven shaft and including an overrunning clutch, a second geared connection of relatively smaller speed drop extending between the second intermediate shaft and the driven shaft and including an overrunning clutch, an openable coupling between the first power clutch and the driven shaft, a third geared connection between the first power clutch and the first intermediate shaft and including an overrunning clutch, a fourth geared connection between said first power clutch and the second intermediate shaft including an overrunning clutch and an openable coupling, a fifth geared connection from the second power clutch to the first intermediate shaft and a sixth geared connection between said second power clutch and the second intermediate shaft and including an openable clutch, said third and fourth geared connections from said first clutch to the intermediate shafts having speed drops which are comparatively larger with respect to the speed drops of the fifth and sixth geared connections between the second power clutch and the intermediate shafts.

13. A transmission comprising a driver, a driven shaft, a first and a second power clutch respectively operable from the driver, first and second intermediate shafts, a first driving train of relatively large speed drop connecting the first intermediate shaft and the driven shaft and including an overrunning clutch, a second driving train of relatively smaller speed drop connecting the second intermediate shaft to the driven shaft and including an overrunning clutch, an openable coupling between the first power clutch and the driven shaft, a third driving train between the first power clutch and the first intermediate shaft and including an overrunning clutch, a fourth driving train between said first power clutch and the second intermediate shaft including an overrunning clutch and an openable coupling, a fifth driving train from the second power clutch to the first intermediate shaft and a sixth driving train between said second power clutch and the second intermediate shaft and including an openable clutch, said third and fourth trains from said first clutch to the intermediate shafts having speed drops which are comparatively larger with respect to the speed drops of the fifth and sixth trains between the second power clutch and the intermediate shafts.

14. A transmission comprising a driven shaft, a driving quill surrounding said shaft, first and second countershafts lying parallel to the driven shaft and having geared connections with said driven shaft including overrunning clutches, the geared connection from the first countershaft having a greater speed drop than the geared connection from the second countershaft, a first and a second selectively operable clutch each having a driving element directly connected to the driving quill, first and second driven quills connected with the respective clutches and surrounding the driven shaft, the first quill having a common relatively small pinion forming parts of geared connections to the countershafts which connections respectively include an overrunning clutch, said second quill having a common relatively larger pinion also forming parts of geared connections to the countershafts, selectively openable clutches in each of the geared connections between the second countershaft and the clutch quills, and a selectively closable clutch between the first quill and said driven shaft.

15. A transmission comprising a driven shaft, a driver, first and second selectively operable power clutches connected with said driver, first and second auxiliary shafts having gearing connecting with the driven shaft, the gearing from the first auxiliary shaft having a greater speed drop than that from the second auxiliary shaft and including an overrunning clutch allowing overrun of the driven shaft relative to the first gearing when driven by the second gearing, first and second pinions respectively driven by said first and second clutches, first and second branched gear trains between the first and second pinions and the first and second auxiliary shafts respectively, the branches of the second branched gear train having smaller speed drops than the speed drops of the branches of the first branched gear train, the branches of said first branched gear train including overrunning clutches allowing the respective auxiliary shafts to overrun the first gear train branches when driven by the second branched gear train branches.

16. A transmission comprising a driven shaft, a driver, first and second selectively operable power clutches connected with said driver, first and second auxiliary shafts having gearing connecting with the driven shaft, the gearing from the first auxiliary shaft having a greater speed drop than that from the second auxiliary shaft and including an overrunning clutch allowing overrun of the driven shaft relative to the first gearing when driven by the second gearing, first and second pinions respectively driven by said first and second clutches, first and second branched gear trains between the first and second pinions and the first and second auxiliary shafts respectively, the branches of the second branched gear train having smaller speed drops than the speed drops of the branches of the first branched gear train, the branches of said first branched gear train including overrunning clutches allowing the respective auxiliary shafts to overrun the first gear train branches when driven by the second branched gear train branches, a selectively operable coupling for connecting the first power clutch directly to the driven shaft, and an overrunning clutch in the gearing between the second auxiliary shaft and the driven shaft allowing the latter to overrun when directly connected to the first power clutch.

17. A transmission comprising a driven shaft, a driver, first and second selectively operable power clutches connected with said driver, first and second auxiliary shafts having gearing connecting with the driven shaft, the gearing from the first auxiliary shaft having a greater speed drop than that from the second auxiliary shaft and including an overrunning clutch allowing overrun of the driven shaft relative to the first gearing when driven by the second gearing, first and second pinions respectively driven by said first and second clutches, first and second branched gear trains between the first and second pinions and the first and second auxiliary shafts respectively, the branches of the second branched gear train having smaller speed drops than the speed drops of the branches of the first branched gear train, the branches of said first branched gear train including overrunning clutches allowing the respective auxiliary shafts to overrun the first gear train branches when driven by the second branched gear train branches, and selectively operable couplings in the first and second gear train branches which extend to the second auxiliary shaft.

18. A transmission comprising a driven shaft, a driver, first and second selectively operable power clutches connected with said driver, first and second auxiliary shafts having gearing connecting with the driven shaft, the gearing from the first auxiliary shaft having a greater speed drop than that from the second auxiliary shaft and including an overrunning clutch allowing overrun of the driven shaft relative to the first gearing when driven by the second gearing, first and second pinions respectively driven by said first and second clutches, first and second branched gear trains between the first and second pinions and the first and second auxiliary shafts respectively, the branches of the second branched gear train having smaller speed drops than the speed drops of the branches of the first branched gear train, the branches of said first branched gear train including overrunning clutches allowing the respective auxiliary shafts to overrun the first gear train branches when driven by the second branched gear train branches, a selectively operable coupling for connecting the first clutch directly to the driven shaft, an overrunning clutch in the gearing between the second auxiliary shaft and the driven shaft allowing the latter to overrun when directly connected to the first clutch, and selectively operable couplings in the first and second gear train branches which extend to the second auxiliary shaft.

19. A transmission comprising a driven shaft, a first and a second power clutch concentrically mounted around the shaft, parallel layshafts located next to said shaft; first and second reverting gear trains having a central drive gear driven by the first power clutch, intermediate gears supported by said layshafts and central final gears adapted to be connected with the driven shaft; each reverting gear train including a branch train having a gear supported by the respective layshaft and a central gear connected with the second power clutch, overrunning mechanisms incorporated in the reverting and branch trains such that any energized complete train between either of the power clutches and the driven shaft having the lowest speed drop will overrun any other energized complete train of greater speed drop, and an openable direct coupling between one of the power clutches and the driven shaft.

20. A transmission comprising a driven shaft, a first and a second power clutch concentrically mounted around the shaft, parallel layshafts located next to said driven shaft; first and second reverting gear trains having a common central drive gear driven by the first power clutch, intermediate gears supported by said layshafts and central final gears adapted to be connected with the driven shaft; each reverting gear train including a branch train having a gear supported by the respective layshaft and a common central gear connected with the second power clutch, overrunning clutches incorporated in the reverting and branch trains such that any energized complete train between either of the power clutches and the driven shaft having the lowest speed drop will overrun any other energized complete train of greater speed drop, and an openable direct coupling between one of the power clutches and the driven shaft.

21. A transmission comprising a driven shaft, a first and a second power clutch coaxially mounted with respect to the shaft, parallel layshafts located next to said driven shaft; first and second reverting gear trains having a central drive gear driven by the first power clutch, intermediate gears supported by said layshafts and central final gears adapted to be connected with the driven shaft; each reverting gear train including a branch train having a gear supported by the respective layshaft and a central gear connected with the second power clutch, and overrunning mechanisms incorporated in the reverting and branch trains such that any energized complete train between either of the power clutches and the driven shaft having the lowest speed drop will overrun any other energized complete train of greater speed drop.

22. A transmission comprising a driving member and a driven member, the driving member driving two power clutches each having a driven element, two countershafts, each clutch having a gear drive to each countershaft, one of the resulting two gear drives to each countershaft having a speed drop greater than the other and including a clutch adapted to be released, whereby the other gear drive for the respective countershaft can overrun when its respective power clutch is energized and the releasing clutch is released, and gear drives from the respective countershafts to the driven member, at least one of said last-mentioned gear drives including a clutch also adapted to be released.

MARTIN P. WINTHER.

REFERENCES CITED

The following references are of record in the file of this patent:

UNITED STATES PATENTS

| Number | Name | Date |
|---|---|---|
| 2,259,732 | Burtnett | Oct. 21, 1941 |
| 2,386,540 | Campodonico | Oct. 9, 1945 |
| 2,386,541 | Campodonico | Oct. 9, 1945 |
| 2,440,588 | Kegresse | Apr. 27, 1948 |

FOREIGN PATENTS

| Number | Country | Date |
|---|---|---|
| 460,770 | Great Britain | Jan. 29, 1937 |
| 528,084 | France | Aug. 9, 1921 |
| 878,589 | France | Jan. 25, 1943 |